United States Patent
Inoue et al.

(10) Patent No.: US 9,608,275 B2
(45) Date of Patent: Mar. 28, 2017

(54) ELECTRICALLY CONDUCTIVE LAYER COATED ALUMINUM MATERIAL AND METHOD FOR MANUFACTURING THE SAME

(75) Inventors: Hidetoshi Inoue, Osaka (JP); Kunihiko Nakayama, Osaka (JP); Zenya Ashitaka, Osaka (JP)

(73) Assignee: TOYO ALUMINIUM KABUSHIKI KAISHA, Osaka-shi (JP)

( * ) Notice: Subject to any disclaimer, the term of this patent is extended or adjusted under 35 U.S.C. 154(b) by 724 days.

(21) Appl. No.: 13/820,071

(22) PCT Filed: Aug. 12, 2011

(86) PCT No.: PCT/JP2011/068412
§ 371 (c)(1),
(2), (4) Date: Feb. 28, 2013

(87) PCT Pub. No.: WO2012/035918
PCT Pub. Date: Mar. 22, 2012

(65) Prior Publication Data
US 2013/0157131 A1   Jun. 20, 2013

(30) Foreign Application Priority Data

Sep. 14, 2010 (JP) ................... 2010-205200

(51) Int. Cl.
*H01G 9/045* (2006.01)
*H01M 4/66* (2006.01)
(Continued)

(52) U.S. Cl.
CPC .............. *H01M 4/667* (2013.01); *C23C 8/20* (2013.01); *C23C 8/64* (2013.01); *C23C 28/00* (2013.01);
(Continued)

(58) Field of Classification Search
CPC ...... H01M 4/0471; H01M 4/64; H01M 4/667; H01M 4/366; H01M 4/66; H01G 11/50;
(Continued)

(56) References Cited

U.S. PATENT DOCUMENTS 7,006,348 B1 * 2/2006 Ueda et al. .................. 361/530
2002/0042976 A1   4/2002 Shin et al.
(Continued)

FOREIGN PATENT DOCUMENTS

| CN | 101233630 A | 7/2008 |
|----|-------------|--------|
| JP | 10-64765 A  | 3/1998 |

(Continued)

OTHER PUBLICATIONS

Inoue et al. WO 2008/142913. Nov. 27, 2008. English machine translation by JPO.*

*Primary Examiner* — James Lee
(74) *Attorney, Agent, or Firm* — Birch, Stewart, Kolasch & Birch, LLP

(57) ABSTRACT

Provided are an electrically conductive layer coated aluminum material having properties which can withstand long term use; and a method for manufacturing the electrically conductive layer coated aluminum material. The electrically conductive layer coated aluminum material includes: an aluminum material (1); a first electrically conductive layer (2); an interposing layer (3); and a second electrically conductive layer (4). The first electrically conductive layer (2) is formed on a surface of the aluminum material (1) and includes an organic substance having electrical conductivity. The interposing layer (3) is formed between the aluminum material (1) and the first electrically conductive layer (2) and includes a carbide of aluminum. The second electrically conductive layer (4) is formed on a surface of the first electrically conductive layer (2) and includes carbon-containing particles (41). A resin is attached onto the surface of (Continued)

the aluminum material (1) and is dried, a carbon-containing substance is attached thereonto, and thereafter, the aluminum material (1) is placed in a space including a hydrocarbon-containing substance and is heated, thereby forming the first electrically conductive layer (2), the interposing layer (3), and the second electrically conductive layer (4).

11 Claims, 2 Drawing Sheets

(51) Int. Cl.

| | | |
|---|---|---|
| *C23C 8/20* | (2006.01) | |
| *C23C 8/64* | (2006.01) | |
| *C23C 28/00* | (2006.01) | |
| *H01G 9/04* | (2006.01) | |
| *H01G 11/30* | (2013.01) | |
| *H01G 11/50* | (2013.01) | |
| *H01M 4/36* | (2006.01) | |
| *H01M 8/0206* | (2016.01) | |

(52) U.S. Cl.
CPC ............... *H01G 9/04* (2013.01); *H01G 11/30* (2013.01); *H01G 11/50* (2013.01); *H01M 4/366* (2013.01); *H01M 4/661* (2013.01); *H01M 8/0206* (2013.01); *Y02E 60/13* (2013.01); *Y02P 70/56* (2015.11); *Y10T 428/265* (2015.01); *Y10T 428/31678* (2015.04)

(58) Field of Classification Search
CPC .......... H01G 9/04; H01G 11/30; H01G 11/40; H01G 11/68
USPC .................. 429/211, 231.8; 29/623.1–623.5; 428/457, 336; 427/126.1; 361/502
See application file for complete search history.

(56) References Cited

U.S. PATENT DOCUMENTS

| | | |
|---|---|---|
| 2005/0207096 A1 | 9/2005 | Hinoki et al. |
| 2006/0172134 A1 | 8/2006 | Ro et al. |
| 2008/0218945 A1 | 9/2008 | Ro et al. |
| 2009/0305132 A1 | 12/2009 | Gauthier et al. |
| 2011/0027537 A1* | 2/2011 | Inoue et al. .................. 428/172 |

FOREIGN PATENT DOCUMENTS

| | | | |
|---|---|---|---|
| JP | 2005-191423 A | 7/2005 | |
| JP | 2006-100477 A | 4/2006 | |
| JP | 2008-98590 A | 4/2008 | |
| WO | WO 2004/087984 A1 | 10/2004 | |
| WO | WO 2008/142913 A1 | 11/2008 | |
| WO | WO 2010/086961 | * 8/2010 | ............ C23C 24/08 |

\* cited by examiner

ELECTRICALLY CONDUCTIVE LAYER COATED ALUMINUM MATERIAL AND METHOD FOR MANUFACTURING THE SAME

TECHNICAL FIELD

The present invention relates generally to an electrically conductive layer coated aluminum material in which a surface of an aluminum material is coated with an electrically conductive layer and to a method for manufacturing the electrically conductive layer coated aluminum material. More particularly, the present invention relates to an electrically conductive layer coated aluminum material used for an electrode structure of a current collector, an electrode, or the like of an electric double layer capacitor, an electrolytic capacitor, a lithium battery, a lithium-ion battery, a lithium-ion polymer battery, a dye sensitized solar cell, a fuel cell, a solid polymer fuel cell, or the like, and a method for manufacturing the electrically conductive layer coated aluminum material.

BACKGROUND ART

As means for directly converting chemical energy to electrical energy, there is a battery. Since utilizing electrochemical change, the battery performs action of discharge of electrical charge or repeating of charge and the discharge of the electrical charge, the battery is used as a power source for a variety of electrical and electronic apparatuses. In addition, as means for performing the action of the repeating of charge and discharge of the electrical charge, there is a capacitor (condenser). The capacitor is used as an electrical component of a variety electrical and electronic apparatuses.

In recent years, as a secondary battery having a high energy efficiency, a lithium-ion battery, a lithium-ion polymer battery, or the like is used as a power source of a mobile telephone, a personal computer, a camera, or the like. In addition, using a fuel cell as a power source of a car has been tried. Regarding a solar cell, the development of a dye sensitized solar cell, as the next-generation of a crystal solar cell, an amorphous solar cell, and a thin-film solar cell, which allows low-cost widespread use is progressing.

For example, in the fuel cell, a negative electrode material obtained by coating, with an active material of a carbon material, a surface of a current collector formed of an aluminum plate is used.

In the dye sensitized solar cell, an electrode material obtained by coating, with an electrically conductive material such as a carbon material, a surface of a thin film base material is used.

On the other hand, in an electric double layer capacitor which is one of electrochemical capacitors, a polarized electrode obtained by coating, with an active material of an activated carbon powder, a surface of a current collector formed of aluminum foil is used. Specifically, for example, Japanese Patent Application Laid-Open Publication No. 10-64765 (Patent Literature 1) discloses that a binder, an electrical conducting material, and the like are added to the activated carbon powder, are mixed therewith, and are prepared so as to be in a slurry state, and the resultant is applied onto a surface of the aluminum foil and thereafter, is dried at a room temperature, and the resultant is cut so as to have a predetermined size, thereby manufacturing the polarized electrode. In addition, there is a case where a mixture of the activated carbon powder, a resin, and the like is bonded onto a surface of the aluminum foil through thermocompression, thereby manufacturing the polarized electrode.

In an electrolytic capacitor, conventionally, an electric conductor constituted of aluminum foil whose surface area is enlarged through etching has been used as a cathode material. In recent years, a cathode material whose electrode surface is enlarged by attaching a carbon powder onto a surface of aluminum foil has been developed.

The above-mentioned carbon coated aluminum material coated with the active material of the carbon material is manufactured by employing a method in which the carbon material is attached thereonto simply by using a binder. Therefore, manufacturing steps are comparatively easy. However, when it is assumed that the carbon coated aluminum material is used as a constituent material of an electronic component such as an electrode material for a long period of time, there arises a problem in that properties of the carbon coated aluminum material are deteriorated due to heat generated from the electronic component.

In addition, for the purpose of enhancing productivity of a circuit assembly line, an electronic component tends to be a surface-mounted component (Surface Mounted Device). In this case, since the attachment of the electronic component is conducted by employing a reflow method, it is required to maintain the properties of the carbon coated aluminum material even under a harsh temperature condition. In relation to the above-mentioned requirement, since in the carbon coated aluminum material in which the carbon material is attached thereto by using the conventional binder, the binder itself is unstable with respect to heat in general, and through the application of heat, adhesiveness between the carbon material and a surface of the aluminum material becomes weak due to the deterioration of the binder, finally, falling-off of the carbon material may occur. In addition, it has been pointed out since before that if an added amount of the binder is increased in order to enhance the adhesiveness between the carbon material and the surface of the aluminum material, it is likely that a value of resistance is increased due to the presence of the binder or a fluctuation in the value of resistance occurs due to the change of properties of the binder caused by the heat. As described above, when in the carbon coated aluminum material, the binder is used in order to attach the carbon material onto the surface of the aluminum material, there arise many problems.

On the other hand, for example, as disclosed in International Publication No. WO2004/087984 (Patent Literature 2), a carbon coated aluminum material, which includes an aluminum material and a carbon-containing layer formed on a surface of the aluminum material and further includes an interposing layer formed between this aluminum material and the carbon-containing layer and including an aluminum element and a carbon element, has been developed. In this carbon coated aluminum material, the interposing layer formed between the aluminum material and the carbon-containing layer as an active material layer acts to enhance the adhesiveness between the aluminum material and the active material layer. Therefore, the problem in that through the application of heat, the adhesiveness between the carbon-containing layer and the surface of the aluminum material becomes weak is solved. In addition, even if the binder is used as one of the starting materials of the carbon-containing layer, since heat is applied in order to form the carbon-containing layer, the binder has been vanished. Accordingly, the problem of a reduction in the adhesiveness, resulting from the deterioration of the binder due to the heat as described above, does not arise.

CITATION LIST

Patent Literature

Patent Literature 1: Japanese Patent Application Laid-Open Publication No. 10-64765
Patent Literature 2: International Publication No. WO2004/087984

SUMMARY OF THE INVENTION

Technical Problem

However, in the above-mentioned carbon coated aluminum material, while the carbon coated aluminum material is used for a long period of time as a constituent material of the electronic component as the electrode material or the like, a very small amount of moisture entering through an exterior case of the electronic component or moisture remaining inside the electronic component in the manufacturing steps may penetrate into interstices of the carbon-containing layer. In this case, the interposing layer causes hydration reaction, and thus, the active material such as carbon particles or the like included in the carbon-containing layer falls off. This is likely to reduce reliability of the electronic component.

Therefore, objects of the present invention are to provide an electrically conductive layer coated aluminum material having properties which can withstand long term use; and a method for manufacturing the electrically conductive layer coated aluminum material.

Solution to Problem

An electrically conductive layer coated aluminum material according to the present invention includes: an aluminum material; a first electrically conductive layer; an interposing layer; and a second electrically conductive layer. The first electrically conductive layer is formed on a surface of the aluminum material and includes an organic substance having electrical conductivity. The interposing layer is formed between the aluminum material and the first electrically conductive layer and includes a carbide of aluminum. The second electrically conductive layer is formed on a surface of the first electrically conductive layer and includes carbon.

In the electrically conductive layer coated aluminum material according to the present invention, it is preferable that the interposing layer includes a surface part being formed in a region of at least one part of the surface of the aluminum material and including the carbide of aluminum.

In addition, in the electrically conductive layer coated aluminum material according to the present invention, it is preferable that a thickness of the first electrically conductive layer is greater than or equal to 0.5 μm and less than or equal to 10 μm.

Furthermore, in the electrically conductive layer coated aluminum material according to the present invention, it is preferable that the first electrically conductive layer is formed of a substance which is not volatilized by heating in an atmosphere including a hydrocarbon-containing substance at a temperature in a range of greater than or equal to 450° C. and less than 660° C. for a period of time greater than or equal to one hour and less than or equal to 100 hours.

It is preferable that the electrically conductive layer coated aluminum material according to the present invention is used to form an electrode structure.

It is preferable that the electrode structure is either of a current collector or an electrode of a capacitor.

It is preferable that the electrode structure is either of a current collector or an electrode of a battery.

A method for manufacturing an electrically conductive layer coated aluminum material, according to the present invention, includes the below-described steps.

(A) A first step of forming a first electrically conductive precursor layer by attaching a resin onto a surface of an aluminum material and drying the resultant.

(B) A second step, after the first step, of forming a second electrically conductive precursor layer by attaching a carbon-containing substance onto the first electrically conductive precursor layer.

(C) A third step, after the second step, of forming a first electrically conductive layer including an organic substance having electrical conductivity on the surface of the aluminum material, forming an interposing layer including a carbide of aluminum between the aluminum material and the first electrically conductive layer, and forming a second electrically conductive layer including carbon on a surface of the first electrically conductive layer, by placing the aluminum material in a space including a hydrocarbon-containing substance and heating the placed aluminum material.

In the method for manufacturing the electrically conductive layer coated aluminum material, according to the present invention, it is preferable that that the second step includes a drying step of drying the second electrically conductive precursor layer.

In addition, in the method for manufacturing the electrically conductive layer coated aluminum material, according to the present invention, it is preferable that the third step includes heating the aluminum material at a temperature in a range of greater than or equal to 450° C. and less than 660° C.

Furthermore, in the method for manufacturing the electrically conductive layer coated aluminum material, according to the present invention, it is preferable that the resin is a resin which is not volatilized by heating in an atmosphere including a hydrocarbon-containing substance at a temperature in a range of greater than or equal to 450° C. and less than 660° C. for a period of time greater than or equal to one hour and less than or equal to 100 hours.

Advantageous Effects of the Invention

As described above, according to the present invention, on a surface of an aluminum material, a first electrically conductive layer including an organic substance having electrical conductivity is provided. Since the present invention is constituted as described above, in a case where the electrically conductive layer coated aluminum material is exposed to an atmosphere having a high temperature and a high humidity for a long period of time, the first electrically conductive layer acts as a barrier layer against the penetration of moisture. Thus, the penetration of the moisture included in the atmosphere into the surface of the aluminum material can be suppressed. In addition, on a surface of the first electrically conductive layer, a second electrically conductive layer including carbon is formed. The presence of this second electrically conductive layer including the carbon, together with the first electrically conductive layer, enables electrical conductivity to be ensured. As a result, since as compared with the conventional carbon coated aluminum material, hydration reaction with the moisture in the atmosphere having the high humidity can be suppressed and the electrical conductivity can be ensured, it is made possible that the electrically conductive layer coated aluminum material according to the present invention can be used in a harsh atmosphere having a high temperature and a high humidity for a longer period of time than the conventional one.

DESCRIPTION OF EMBODIMENTS

Hereinafter, an embodiment of the present invention will be described with reference to the accompanying drawings.

[Electrically Conductive Layer Coated Aluminum Material]

Figure 1:
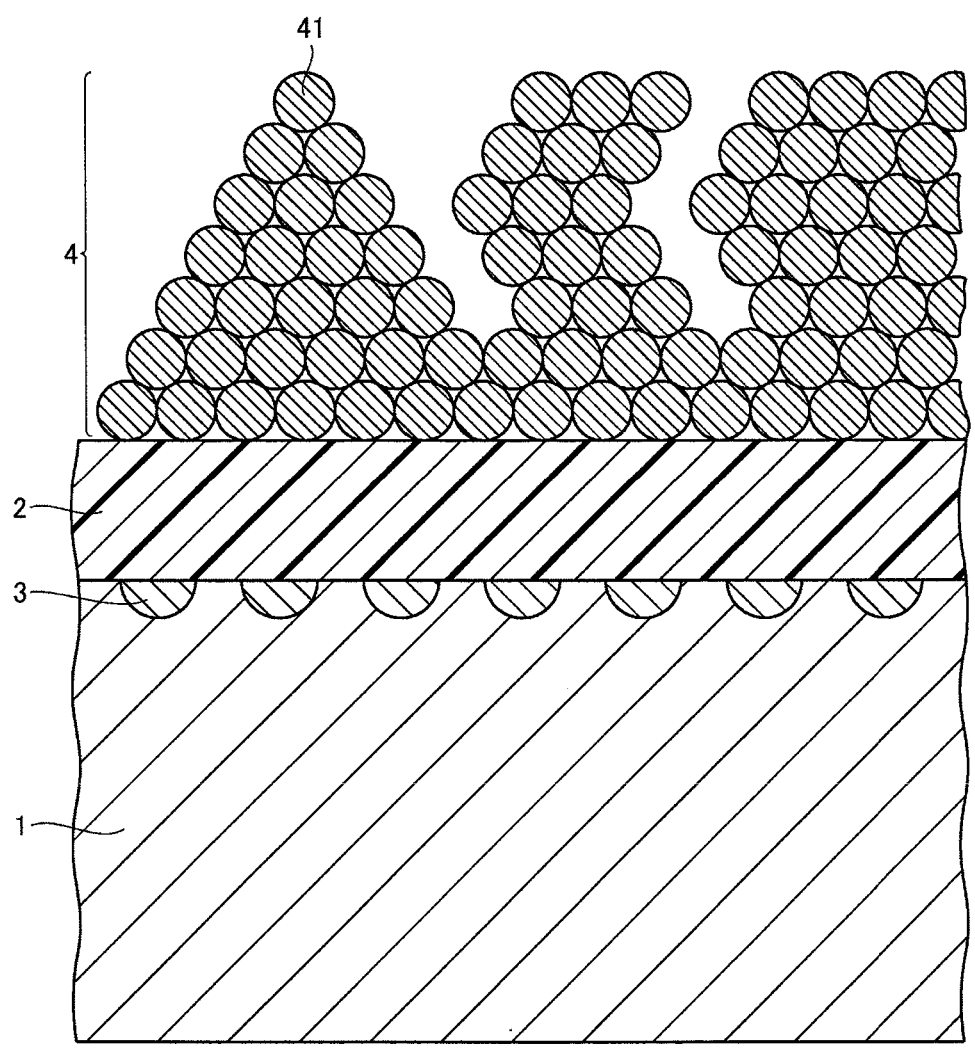
FIG. 1 is a cross-sectional view schematically illustrating a cross-sectional structure of an electrically conductive layer coated aluminum material as one embodiment of the present invention.

As shown in FIG. 1, in a cross-sectional structure of an electrically conductive layer coated aluminum material as one embodiment of the present invention, a first electrically conductive layer 2 including an organic substance having electrical conductivity is formed on a surface of an aluminum material 1, and further, a second electrically conductive layer 4 including carbon is formed on a surface of the first electrically conductive layer 2.

The first electrically conductive layer 2 has an extremely close structure. This close structure allows the first electrically conductive layer 2 to act as a barrier layer for preventing moisture included in an atmosphere from reaching the surface of the aluminum material 1 when the first electrically conductive layer 2 is exposed to an atmosphere at a high temperature and a high humidity for a long period of time, thereby making it possible to suppress the penetration of the moisture into the surface of the aluminum material. The first electrically conductive layer 2 includes, for example, a carbon precursor as the organic substance having the electrical conductivity.

Between the aluminum material 1 and the first electrically conductive layer 2, interposing layers 3 including an aluminum element and a carbon element are formed. Preferably, the interposing layers 3 are formed in at least one part of regions of the surface of the aluminum material 1 and include a carbide of aluminum, for example, $Al_4C_3$. Some parts of the first electrically conductive layer 2 are adherent directly to the aluminum material 1, and the other parts of the first electrically conductive layer 2 are adherent via the interposing layer 3 to the aluminum material 1. Although the first electrically conductive layer 2 is adherent directly to the aluminum material 1, thereby having sufficient adhesiveness, the interposing layers 3 are present, thereby more tightly attaching the first electrically conductive layer 2 to the aluminum material 1.

The second electrically conductive layer 4 including the carbon plays a role of an active material layer which increases a surface area of the aluminum material 1. The second electrically conductive layer 4 including the carbon includes a multitude of carbon-containing particles 41 functioning as the active material. Each of the plurality of carbon-containing particles 41 is adherent to the surface of the first electrically conductive layer 2. In addition, the plurality of carbon-containing particles 41 deposited on the surface of the first electrically conductive layer 2 are also adherent to one another.

As shown in FIG. 1, in the one embodiment, at least one part of the first electrically conductive layer 2 is adherent to the at least one part of regions of the interposing layer 3. The one part of the first electrically conductive layer 2 formed on the surface of the aluminum material 1 may be adherent onto the surfaces of the regions of the one part of the interposing layers 3, and the other part of the first electrically conductive layer 2 may be adherent directly onto the surface of the aluminum material 1 where the interposing layers 3 are not formed, instead of the surfaces of the interposing layers 3. In addition, although as shown in FIG. 1, the plurality of interposing layers 3 are formed in an island-like manner so as to be spaced apart from one another on the surface of the aluminum material 1, the plurality of interposing layers 3 may be formed in the island-like manner so as to be adjacent to one another.

In the electrically conductive layer coated aluminum material according to the present invention shown in FIG. 1, first, the interposing layers 3 formed between the aluminum material 1 and the first electrically conductive layer 2 and including the carbide of aluminum act to enhance the adhesiveness of the surface of the aluminum material 1 and the first electrically conductive layer 2 formed on the surface of the aluminum material 1. As a result of this action, even under the high humidity condition, the penetration of the moisture into the aluminum material 1 and the first electrically conductive layer 2 can be suppressed.

It is preferable that the carbon precursor included in the first electrically conductive layer 2 formed on the surface of the aluminum material 1 includes at least carbon and hydrogen elements, and it is preferable that the carbon precursor includes a component similar to graphite or a component similar to amorphous carbon. It is inferred that by conducting the later-described third step, the first electrically conductive precursor layer formed on the surface of the aluminum material 1 changes to the first electrically conductive layer 2 including the organic substance having the electrical conductivity, that is, the first electrically conductive layer 2 including the carbon precursor.

In addition, on the surface of the first electrically conductive layer 2, the second electrically conductive layer 4 including the carbon is formed. Owing to the presence of the second electrically conductive layer 4 including the carbon, together with the first electrically conductive layer 2, the electrical conductivity can be ensured.

Accordingly, the electrically conductive layer coated aluminum material includes the second electrically conductive layer 4 including the carbon as the active material layer and the first electrically conductive layer 2, thereby allowing hydration reaction with the moisture in the atmosphere at the high humidity to be suppressed and the electrical conductivity to be ensured.

In addition, in the electrically conductive layer coated aluminum material according to the present invention, the first electrically conductive layer 2 is only required to be formed on at least one surface of the aluminum material 1, and it is preferable that a thickness thereof is within a range of greater than or equal to 0.5 μm and less than or equal to 10 μm. Although the first electrically conductive layer 2 may be formed on the whole surface of the aluminum material 1, a part in which the first electrically conductive layer 2 is not formed may be provided in one part of the aluminum material 1 in accordance with an application to which the electrically conductive layer coated aluminum material is finally applied (for example, in a case where it is desired to provide a part, in which the first electrically conductive layer 2 is not formed, in order to connect a terminal to an end portion of the aluminum material 1, and the like).

In addition, in the electrically conductive layer coated aluminum material according to the present invention, the second electrically conductive layer 4 including the carbon is only required to be formed on at least one surface of the aluminum material 1, and it is preferable that a thickness thereof is greater than or equal to one μm and less than or equal to 500 μm.

It is preferable that the first electrically conductive layer 2 is formed of a substance which is not volatilized by heating in an atmosphere including a hydrocarbon-containing substance at a temperature in a range of greater than or equal to 450° C. and less than 660° C. for a period of time greater than or equal to one hour and less than or equal to 100 hours.

In the electrically conductive layer coated aluminum material having the above-described configuration according to the present invention, it is preferable that in the below-defined hydrochloric acid exfoliation test, a period of time lasting until the first electrically conductive layer 2 is completely exfoliated from the aluminum material 1 is longer.

<Hydrochloric Acid Exfoliation Test>

A strip-like electrically conductive layer coated aluminum material having a width of 10 mm and a length of 100 mm is immersed in a hydrochloric acid solution having a temperature of 80° C. and a concentration of 1M (M means a molar concentration [mol/liter]), a period of time lasting until the first electrically conductive layer 2 is completely exfoliated from an aluminum material 1 is measured.

When this period of time is long, it can be said that the first electrically conductive layer 2 and a second electrically conductive layer 4 including carbon are stably adherent to an aluminum material 1 for a long period of time.

[Aluminum Material]

In the one embodiment of the present invention, the aluminum material 1 as a base material on which the first electrically conductive layer 2 is formed is not particularly limited, and pure aluminum or an aluminum alloy can be used. It is preferable that such an aluminum material 1 has an aluminum purity of 98% by mass or more as a value measured in accordance with a method described in "JIS H2111". As the aluminum material 1 used in the present invention, included is an aluminum alloy having composition into which at least one kind of an alloy element selected from the group consisting of lead (Pb), silicon (Si), iron (Fe), copper (Cu), manganese (Mn), magnesium (Mg), chromium (Cr), zinc (Zn), titanium (Ti), vanadium (V), gallium (Ga), nickel (Ni), and boron (B) is added so as to have a content being within a necessary range; or also aluminum having composition in which a content of the above-mentioned unavoidable impurity element is limited. Although a thickness of the aluminum material 1 is not particularly limited, when the aluminum material 1 is foil, it is preferable that a thickness thereof is within a range of greater than or equal to 5 μm and less than or equal to 200 μm, and when the aluminum material 1 is a plate, it is preferable that a thickness thereof is within a range exceeding 200 μm and less than or equal to 3 mm.

As the above-described aluminum material 1, an aluminum material manufactured by employing the heretofore known method can be used. For example, molten aluminum or a molten aluminum alloy, which has the above-mentioned predetermined composition, is prepared and an ingot obtained by casting the molten aluminum or the molten aluminum alloy is appropriately subjected to a homogenization process. Thereafter, this ingot is subjected to hot rolling and cold rolling, thereby allowing the aluminum material 1 to be obtained. Midway in the above-mentioned cold rolling process, an intermediate annealing process at a temperature which is within a range of greater than or equal to 150° C. and less than or equal to 400° C. may be conducted.

[Electrode Structure or the Like]

It is preferable that the electrically conductive layer coated aluminum material according to the present invention having any of the above-described features is used to form an electrode structure.

It is preferable that the above-mentioned electrode structure is used to form a current collector or an electrode of a capacitor. This allows capacitance characteristics, internal resistance characteristics, charge and discharge characteristics, and life of a capacitor to be enhanced. As an example of a capacitor, an electric double layer capacitor, an aluminum electrolytic capacitor, a functional solid capacitor, or the like is cited.

In addition, it is preferable that the above-mentioned electrode structure is used to form a current collector or an electrode of a battery. This allows capacitance characteristics, internal resistance characteristics, charge and discharge characteristics, and life of a battery to be enhanced. As an example of a battery, a secondary battery such as a lithium ion battery is cited.

[A Method for Manufacturing an Electrically Conductive Layer Coated Aluminum Material]

Although a method for manufacturing the electrically conductive layer coated aluminum material, according to the present invention, is not particularly limited, for example, at a first step, a resin is attached onto a surface of the aluminum material 1 and is dried, thereby forming a first electrically conductive precursor layer. After the first step, a carbon-containing substance is attached onto the first electrically conductive precursor layer, thereby forming a second electrically conductive precursor layer. After the second step, the aluminum material 1 is placed in a space including a hydrocarbon-containing substance and is heated, thereby forming the first electrically conductive layer 2 including an organic substance having electrical conductivity on the surface of the aluminum material 1, forming interposing layers 3 including a carbide of aluminum between the aluminum material 1 and the first electrically conductive layer 2, and forming a second electrically conductive layer 4 including carbon on a surface of the first electrically conductive layer 2. Hereinafter, the method will be described in detail.

<First Step>

In one embodiment of the method for manufacturing an electrically conductive layer coated aluminum material, according to the present invention, first, a first electrically conductive precursor layer is formed on a surface of an aluminum material 1 (first step). In this first step, the first electrically conductive precursor layer formed on the surface of the aluminum material 1 is heated, thereby conducting drying (drying step 1). Thus, a resin constituting the first electrically conductive precursor layer can be appropriately reacted and solidified, and in the subsequently conducted second step, a carbon-containing substance is attached onto the first electrically conductive precursor layer, thereby allowing the dissolution of the resin into the carbon-containing substance and the mixing of the resin with the carbon-containing substance to be suppressed and enabling the first electrically conductive precursor layer being stable to be formed.

Although a drying temperature in this drying step 1 varies depending on the kind of the resin used in the formation of the first electrically conductive precursor layer, ordinarily, it is preferable that the drying step 1 is conducted at a temperature within a range of greater than or equal to 100° C. and less than 450° C. In addition, although a drying time in the drying step 1 varied depending on the kind of the resin used in the formation of the first electrically conductive precursor layer, it is preferable that the drying step 1 is conducted within a period of time of 10 seconds to 10 minutes.

If this drying temperature is less than 100° C., it is likely that the reaction and solidification of the resin are not sufficiently made. In particular, when the first electrically conductive precursor layer is formed through coating of a mixture of a resin and an organic solvent, the solvent is not sufficiently volatilized and remains, and upon heating in the subsequent third step, the solvent is abruptly volatilized, thereby causing bubbles (bubbling) in the first electrically conductive precursor layer. In addition, if the above-mentioned drying temperature is greater than or equal to 450° C., oxidation reaction of the first electrically conductive precursor layer progresses, whereby it is likely that the first electrically conductive precursor layer itself is dissolved and vanished.

Similarly, if the above-mentioned drying time is shorter than 10 seconds, it is likely that the reaction and solidification of the resin are not sufficiently made. In particular, if the first electrically conductive precursor layer is formed through the coating of the mixture of the resin and the organic solvent, the solvent is not sufficiently volatilized and remains, and upon heating in the subsequent third step, the solvent is abruptly volatilized, thereby causing bubbles (bubbling) in the first electrically conductive precursor layer. In addition, if the above-mentioned drying time exceeds 10 minutes, depending on a drying temperature, oxidation reaction of the first electrically conductive precursor layer progresses, whereby it is likely that the first electrically conductive precursor layer itself is vanished.

The first electrically conductive precursor layer is only required to be formed on at least one surface of the aluminum material 1. Although a thickness thereof is not particularly limited, it is preferable that the thickness thereof is greater than or equal to one μm and less than or equal to 10 μm. By forming the first electrically conductive precursor layer having a thickness within this range, the first electrically conductive layer 2 which is even and acts as a barrier layer for suppressing the reaction of the aluminum material 1 and the moisture can be obtained, and reliability of the electrically conductive layer coated aluminum material can be more preferably enhanced.

In the method for manufacturing the electrically conductive layer coated aluminum material according to the present invention, it is preferable that the first step includes a step (mixing step) at which the resin and the solvent are mixed.

This mixing step is included, thereby allowing the first electrically conductive precursor layer to be evenly formed on the surface of the aluminum material 1 and allowing the first electrically conductive layer 2 formed through undergoing the subsequent third step to be evenly formed on the surface of the aluminum material 1. This allows the first electrically conductive layer 2 having a close structure to be evenly formed on the surface of the aluminum material 1 and allows the hydration reaction with the moisture in the atmosphere having the high humidity to be suppressed even in any part of the surface of the aluminum material 1.

The resin used in the first step is not particularly limited. However, for example, cited are resins such as a polyvinyl alcohol based resin, a polyvinyl butyral based resin, an epoxy based resin, a resin having a ring structure such as an aromatic resin (for example, a phenol based resin), and an acryl based resin, and in particular, the phenol based resin is preferable.

In addition, in terms of characteristics of the resin, it is preferable to use a resin which is not volatilized by heating in a hydrocarbon atmosphere at a temperature in a range of greater than or equal to 450° C. and less than 660° C. for a period of time in a range of greater than or equal to one hour and less than or equal to 100 hours. This is because if the first electrically conductive precursor layer is volatilized upon conducting the drying step 1, a defect or a crack is caused in the first electrically conductive layer 2 subsequently formed, it is made easy to form the interposing layers 3 in missing parts in the first electrically conductive layer 2, and as a result, the effect to suppress the hydration reaction cannot be obtained.

Although the solvent appropriately used in the first step is not particularly limited, a good solvent of a resin (solvent in which the resin is soluble) is preferable. For example, in a case where as the resin, an oil soluble resin is used, methyl isobutyl ketone, toluene, methyl ethyl ketone, or the like is cited.

In the above-described first step, as a method of forming the first electrically conductive precursor layer on the surface of the aluminum material 1, employed is a method in which a slurry-state or a liquid-state preparation is made by using the resin and the solvent and is attached onto the surface of the aluminum material 1 through coating, dipping, or the like, or a method in which a solid-state preparation is made and is attached in the form of powder onto the surface of the aluminum material 1 through spraying, extrusion, thermocompression bonding, or the like.

<Second Step>

Next, the carbon-containing substance is attached onto the first electrically conductive precursor layer, thereby forming a second electrically conductive precursor layer (second step).

As the carbon-containing substance, for example, carbon-containing particles 41 having a structure serving an active material are cited. Although the kind of these carbon-containing particles 41 is not particularly limited, for example, any of activated carbon fiber, activated carbon cloth, activated carbon felt, activated carbon powder, Indian ink, carbon black, graphite, or the like may be used. In addition, as the carbon-containing particles 41, a carbon compound such as a silicon carbide can also be suitably used.

In the second step, as a method of attaching the carbon-containing particles 41, which is the carbon-containing substance, onto the surface of the aluminum material 1 having the first electrically conductive precursor layer formed thereon, the carbon-containing particles 41 are attached onto the first electrically conductive precursor layer formed on the surface of the aluminum material 1 by using a binder, a solvent, water, or the like. After attaching the carbon-containing particles 41 onto the surface of the first electrically conductive precursor layer as described above, before the third step, the second electrically conductive precursor layer may be dried at a temperature within a range of greater than or equal to 20° C. and less than or equal to 300° C. (drying step 2).

Although the solvent used in the second step is not particularly limited, the same solvent as the solvent used in the first step can be used.

The second electrically conductive precursor layer is only required to be formed on at least one surface of the aluminum material 1. Although a thickness thereof is not particularly limited, it is preferable that the thickness thereof is greater than or equal to one μm and less than or equal to 500 μm. By forming the second electrically conductive precursor layer having a thickness within this range, electrical characteristics of the second electrically conductive layer 4 can be made favorable, and adhesiveness of the carbon-containing particles 41 can be enhanced.

The second electrically conductive precursor layer may further include aluminum particles. In particular, when the thickness of the second electrically conductive precursor layer is large, the second electrically conductive precursor layer contains the aluminum particles, whereby after conducting the later-described third step, a fibrous carbide of the aluminum having a cactus-like or whisker-like form is formed so as to face toward an outside from the surface of each of the aluminum particles, and this carbide allows an effect that mutual adhesiveness of the carbon-containing particles 41 can be enhanced and an effect that the exfoliation of the second electrically conductive layer 4 can be suppressed to be attained.

<Third Step>

Thereafter, after the second step, by placing the aluminum material 1 in a space including a hydrocarbon-containing substance and heating the placed aluminum material 1, the first electrically conductive layer 2 including the organic substance having the electrical conductivity is formed on the surface of the aluminum material 1, the interposing layers 3 including the carbide of aluminum are formed between the aluminum material 1 and the first electrically conductive layer 2, and the second electrically conductive layer 4 including the carbon is formed on the surface of the first electrically conductive layer 2 (third step).

By conducting this third step, as shown in FIG. 1, the first electrically conductive layer 2, the interposing layers 3, and the second electrically conductive layer 4 are formed on the surface of the aluminum material 1.

In the one embodiment of the method, according to the present invention, for manufacturing the electrically conductive layer coated aluminum material, the kind of the hydrocarbon-containing substance to be used is not particularly limited. As the kind of the hydrocarbon-containing substance, for example, a paraffin based hydrocarbon such as methane, ethane, propane, n-butane, isobutene, and pentane; an olefin based hydrocarbon such as ethylene, propylene, butene, and butadiene; an acetylene based hydrocarbon such as acetylene; or a derivative of each of these hydrocarbons is cited. Among these hydrocarbons, the paraffin based hydrocarbon such as the methane, the ethane, and the propane is preferable because the paraffin based hydrocarbon becomes gaseous in the process of heating the aluminum material. Further preferable is any one kind of the hydrocarbons of the methane, the ethane, and the propane. The most preferable hydrocarbon is the methane.

In addition, in the manufacturing method according to the present invention, the hydrocarbon-containing substance may be used in any state of a liquid state, a gaseous state, and the like. It is only required for the hydrocarbon-containing substance to be present in a space in which the aluminum material 1 is present, and the hydrocarbon-containing substance may be introduced by employing any method in the space in which the aluminum material 1 is present. For example, in a case where the hydrocarbon-containing substance is in the gaseous state (the methane, the ethane, the propane, etc.), an enclosed space in which the process of heating the aluminum material 1 is conducted may be filled with the hydrocarbon-containing substance alone or in combination with an inert gas. In addition, in a case where the hydrocarbon-containing substance is in the liquid state, the enclosed space may be filled with the hydrocarbon-containing substance alone or in combination with the inert gas so as to allow the hydrocarbon-containing substance to be gasified.

In the third step, a pressure of a heating atmosphere is not particularly limited, and the process thereof may be conducted under an ordinary pressure, a reduced pressure, or an increased pressure. In addition, adjustment of the pressure may be conducted at any time such as time when a certain heating temperature is being retained, time when a temperature is being increased to reach a certain heating temperature, or time when a temperature is being decreased from a certain heating temperature.

A mass ratio of the hydrocarbon-containing substance introduced into the space in which the aluminum material 1 is heated is not particularly limited. Ordinarily, it is preferable that the mass ratio is within a range of greater than or equal to 0.1 part by mass and less than or equal to 50 parts by mass as a value in terms of carbon with respect to 100 parts by mass of the aluminum and it is particularly preferable that the mass ratio is within a range of greater than or equal to 0.5 part by mass and less than or equal to 30 parts by mass as a value in terms of carbon.

In the process of heating the aluminum material 1, a heating temperature may be appropriately set in accordance with composition or the like of the aluminum material 1 to be heated. Ordinarily, it is preferable that the heating temperature is within a range of greater than or equal to 450° C. and less than 660° C. and it is more preferable that the heating temperature is within a range of greater than or equal to 530° C. and less than or equal to 620° C. Here, in the manufacturing method according to the present invention, heating the aluminum material 1 at a temperature less than 450° C. is not excluded, and the aluminum material may be heated at least at a temperature exceeding 300° C.

Although a heating time depends on a heating temperature or the like, the heating time is within a range of greater than or equal to one hour and less than or equal to 100 hours in general.

In a case where a heating temperature is greater than or equal to 400° C., it is preferable that an oxygen concentration in the heating atmosphere is less than or equal to 1.0% by volume. If a heating temperature is greater than or equal to 400° C. and an oxygen concentration in the heating atmosphere exceeds 1.0% by volume, it is likely that the thermally oxidized film on the surface of the aluminum material is overgrown and a surface resistance value of the aluminum material 1 is boosted.

In addition, before the heating process, the surface of the aluminum material may be roughened. A roughening method is not particularly limited and the heretofore known technique such as cleaning, etching, and blast can be used.

In the manufacturing method according to the present invention, after attaching the resin and the carbon-containing substance onto the surface of the aluminum material 1, the simple step in which the aluminum material 1 is placed in the space including the hydrocarbon-containing substance and is heated is conducted, thereby not only allowing the surface of the aluminum material 1 to be coated with the first electrically conductive layer 2 but also allowing the interposing layers 3 including the carbide of aluminum to be formed between the aluminum material 1 and the first electrically conductive layer 2 and further, the second electrically conductive layer 4 including the carbon to be formed. Thus, since as shown in FIG. 1, the first electrically conductive layer 2 having the extremely close structure and second electrically conductive layer 4 including the carbon acting as the active material layer are formed on the surface of the aluminum material 1, the hydration reaction of the aluminum material 1 and the moisture in the atmosphere having the high humidity can be suppressed, and the electrical conductivity can be ensured by the first electrically conductive layer 2 and the second electrically conductive layer 4.

In the manufacturing method according to the present invention, in the third step, by placing the first electrically conductive precursor layer in the space including the hydrocarbon-containing substance and heating the placed first electrically conductive precursor layer, the first electrically conductive precursor layer changes to the first electrically conductive layer 2, and the first electrically conductive layer 2 is formed on the surface of the aluminum material 1. In the third step, although the first electrically conductive precursor layer is heated in the atmosphere including the hydrocarbon-containing substance, the first electrically conductive precursor layer is neither completely oxidized nor vanished and becomes the first electrically conductive layer 2 including the carbon precursor, as the organic substance having the electrical conductivity.

In addition, since the first electrically conductive layer 2 has the extremely close structure, the first electrically conductive layer 2 is present on the surface of the aluminum material 1, whereby the first electrically conductive layer 2 acts as a barrier layer and can suppress the hydration reaction with the moisture in the atmosphere having the high humidity. Thus, it is made possible that the electrically conductive layer coated aluminum material can be used in a harsh atmosphere having a high temperature and a high humidity for a longer period of time than the conventional one.

EXAMPLES

In accordance with the below-described examples 1 through 4 and comparison examples 1 through 3, electrically conductive layer coated aluminum materials, in each of which an aluminum material 1 (aluminum foil) was used as a base material, were prepared.

Examples 1 Through 4

One part by mass of each kind of a resin shown in a column of "Resin" in "First step" in Table 1 was added to four parts by mass of a mixed solvent shown in a column of "Solvent" in "First step" in Table 1 and was mixed therewith to be dissolved, thereby obtaining each coating solution A having a solid content of 20% by mass. As the "solvent" used in "First step" and "Second step" in each of the examples and comparison examples, a mixed solvent of toluene and methyl ethyl ketone (MEK) was used. A mixture ratio (volume ratio) of toluene and methyl ethyl ketone of the mixture solvent was 1:1.

Each coating solution A was applied onto both surfaces of aluminum foil having a thickness of 50 μm and a purity of 99.3% by mass, and drying was conducted at a temperature shown in "Temperature in drying step 1" in "First step" in Table 1 for one minute by using a drying oven, thereby forming a first electrically conductive precursor layer (First step). A thickness of one surface of the first electrically conductive precursor layer, obtained after the drying, was 2 μm.

Thereafter, 5 parts by mass of activated carbon particles having an average particle diameter of 5 μm were added to 15 parts by mass of a mixed solvent shown in "Solvent" in "Second step" in Table 1, was mixed therewith, and was dispersed therein, thereby obtaining each coating solution B having a solid content of 25% by mass. Each coating solution B was applied onto both surfaces of the aluminum foil having the first electrically conductive precursor layer formed thereon, and drying was conducted at a temperature shown in a column of "Temperature in drying step 2" in "Second step" in Table 1 for 2 minutes by using an oven, thereby forming a second electrically conductive precursor layer (Second step). A thickness of one surface of the second electrically conductive precursor layer, obtained after the drying, was 7 μm.

Subsequently, the aluminum foil whose both surfaces had the first electrically conductive precursor layer and the second electrically conductive precursor layer formed thereon was retained in a methane gas atmosphere at a temperature of 600° C. for 10 hours, thereby forming a first electrically conductive layer 2, a second electrically conductive layer 4 including carbon, and interposing layers 3 on the surface of the aluminum foil (Third step).

As described above, the electrically conductive layer coated aluminum materials according to the present invention were prepared.

Figure 2:
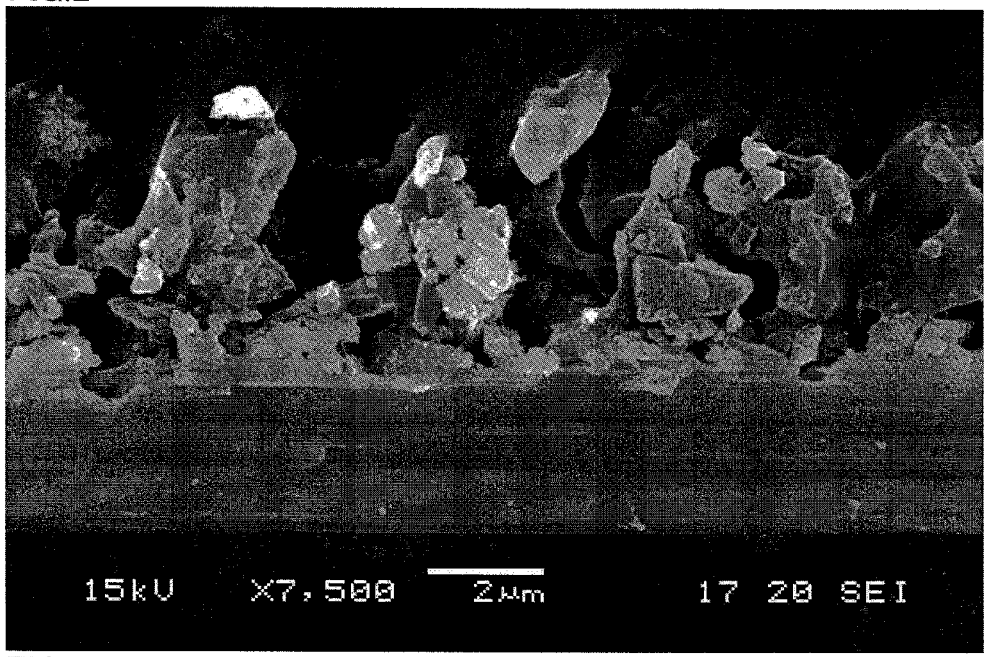
FIG. 2 is a photograph obtained through observing a cross section of a sample in example 1 according to the present invention by using a scanning electron microscope (SEM).

When a cross section of each of the obtained electrically conductive layer coated aluminum materials according to the present invention in examples 1 through 4 was observed, it was able to be confirmed that the first electrically conductive layer 2, the second electrically conductive layer 4 including the carbon, and the interposing layers 3 were formed on the surface of the aluminum material 1. As one example, a photograph obtained through observing a cross section of the electrically conductive layer coated aluminum material in example 1 by using a scanning electron microscope (SEM) is shown in FIG. 2. A magnification of the photograph was 7,500 times.

Figure 3:
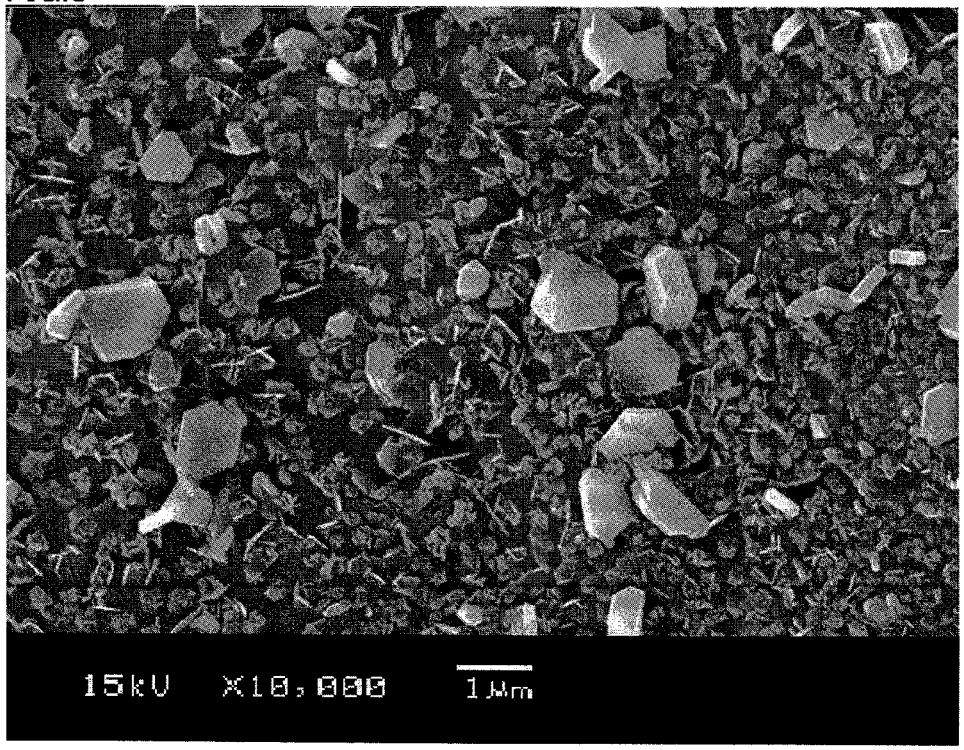
FIG. 3 is a photograph obtained through observing surfaces of interposing layers exposed by removing an aluminum part from the sample in example 1 according to the present invention, the surfaces viewed from back sides of the interposing layers toward a first electrically conductive layer.

In addition, in order to observe the interposing layers 3 of the electrically conductive layer coated aluminum material in example 1, an aluminum part was dissolved by using a bromine-methanol-mixed solution, and a photograph obtained by directly observing surfaces of the remaining interposing layers 3 by using the SEM is shown in FIG. 3. In other words, FIG. 3 shows the photograph obtained by observing back sides of the surfaces of the interposing layers 3 which had the aluminum material 1 removed therefrom and was exposed, the back sides viewed from the interposing layers 3 toward the first electrically conductive layer 2. In FIG. 3, a magnification of the photograph was 10,000 times.

As shown in FIG. 3, a state in which in the electrically conductive layer coated aluminum material, a multitude of the interposing layers have been dispersively formed in an island-like manner on at least one part of regions of the surface of the aluminum material can be seen well.

In each of the electrically conductive layer coated aluminum materials according to the present invention, obtained in examples 1 through 4, a total thickness of the first electrically conductive layer 2 and the second electrically conductive layer 4 was calculated by measuring a thickness of the electrically conductive layer coated aluminum material by means of a micrometer and subtracting a thickness of the aluminum foil from the measured thickness. Judging from the calculated total thickness of the first electrically conductive layer 2 and the second electrically conductive layer 4 and the observation of the cross section by means of the SEM, a thickness of the first electrically conductive layer 2 and a thickness of the second electrically conductive layer 4 including the carbon were 1 μm and 6 μm, respectively.

Comparison Example 1

5 parts by mass of activated carbon particles having an average particle diameter of 5 μm were added to 15 parts by mass of a mixed solvent of toluene and methyl ethyl ketone (MEK) (a mixture ratio (volume ratio) of 1:1) shown in "Solvent" in "Second step" in Table 1, was mixed therewith, and was dispersed therein, thereby obtaining a coating solution having a solid content of 25% by mass. This coating solution was applied onto both surfaces of the aluminum foil having a thickness of 50 μm and a purity of 99.3% by mass, and drying was conducted at a temperature of 300° C. for 2 minutes, thereby forming a carbon-containing substance layer (a step corresponding to the second step in the present invention). A thickness of one surface of the carbon-containing substance layer, obtained after the drying, was 7 μm. Thereafter, the aluminum foil whose both surfaces had the carbon-containing substance layer formed thereon was retained in a methane gas atmosphere at a temperature of 600° C. for 10 hours, thereby forming an electrically conductive layer including carbon (a step corresponding to the third step in the present invention). As described above, the electrically conductive layer coated aluminum material in comparison example 1 was prepared. The method for manufacturing comparison example 1 corresponds to the manufacturing method according to the present invention with the first step excluded therefrom.

With respect to the electrically conductive layer coated aluminum material in comparison example 1, a thickness of an electrically conductive layer was measured by employing the same method as in examples 1 through 4. The thickness of the electrically conductive layer including the carbon was 7 μm.

Comparison Example 2

The same step as the drying step 1 in example 3, except that the temperature was changed to 90° C., was conducted, thereby preparing an electrically conductive layer coated aluminum material. In the manufacturing method in comparison example 2, a state of the electrically conductive layer coated aluminum material was a state in which in the drying step in the first step, only a surface of the first electrically conductive precursor layer was dried and an inside of the first electrically conductive precursor layer was not completely dried (an undried state).

A cross section of the electrically conductive layer coated aluminum material obtained in comparison example 2 was observed by using the SEM. However, the first electrically conductive layer 2 and the second electrically conductive layer 4 including the carbon could not be observed in a clearly discerning manner.

Comparison Example 3

The same step as the drying step 1 in example 4, except that the temperature was changed to 500° C., was conducted, thereby preparing an electrically conductive layer coated aluminum material. In the manufacturing method in comparison example 3, in the drying step in the first step, a resin constituting a first electrically conductive precursor layer was dissolved and vanished.

A cross section of the electrically conductive layer coated aluminum material obtained in comparison example 3 was observed by using the SEM. However, it was confirmed that a first electrically conductive layer 2 was vanished. In addition, a thickness of an electrically conductive layer was measured by employing the same method as in examples 1 through 4. The thickness of the second electrically conductive layer 4 including carbon was 7 μm.

[Evaluation]

With respect to each of the electrically conductive layer coated aluminum materials obtained in examples 1 through 4 and comparison examples 1 through 3, an over-time reliability test (hydrochloric acid exfoliation test) was conducted. The results of the test are shown in Table 1. The evaluation conditions are as described below.

[Over-Time Reliability Test: Hydrochloric Acid Exfoliation Test]

First, a sample was cut from each of the electrically conductive layer coated aluminum materials prepared in examples 1 through 4 and comparison examples 1 through 3 so as to have a strip shape having a width of 10 mm and a length of 100 mm, thereby preparing each test sample. Each of these test samples was immersed in a hydrochloric acid solution having a temperature of 80° C. and a concentration of 1M (M means a molar concentration [mol/liter]), and a period of time lasting until the first electrically conductive layer 2 being adherent to the surface of the aluminum material 1 and the second electrically conductive layer 4 including the carbon were completely exfoliated was measured. Each period of time measured as described above is shown in "Hydrochloric acid exfoliation time" in Table 1.

TABLE 1

|  | First step | | | Second step | | Hydrochloric acid exfoliation time [sec] |
|  | Resin | Solvent | Drying step 1 Temperature [° C.] | Solvent | Drying step 2 Temperature [° C.] | |
| --- | --- | --- | --- | --- | --- | --- |
| Example 1 | Phenol based resin | Toluene/MEK | 300 | Toluene/MEK | 250 | 500 |
| Example 2 | Polyimide based resin | Toluene/MEK | 300 | Toluene/MEK | 250 | 450 |
| Example 3 | Epoxy based resin | Toluene/MEK | 250 | Toluene/MEK | 250 | 350 |
| Example 4 | Acryl based resin | Toluene/MEK | 250 | Toluene/MEK | 250 | 300 |
| Comparison example 1 | — | — | — | Toluene/MEK | 300 | 120 |

TABLE 1-continued

| | First step | | | Second step | | |
|---|---|---|---|---|---|---|
| | Resin | Solvent | Drying step 1 Temperature [° C.] | Solvent | Drying step 2 Temperature [° C.] | Hydrochloric acid exfoliation time [sec] |
| Comparison example 2 | Epoxy based resin | Toluene/MEK | 90 | Toluene/MEK | 250 | 150 |
| Comparison example 3 | Acryl based resin | Toluene/MEK | 500 | Toluene/MEK | 250 | 100 |

In the results shown in Table 1, it is shown that in each of the electrically conductive layer coated aluminum materials in examples 1 through 4, the hydration reaction was suppressed and characteristics excellent in the adhesiveness of the first electrically conductive layer 2 to the aluminum material 1 were exhibited, as compared with each of the electrically conductive layer coated aluminum materials in comparison examples 1 through 3.

This proves that each of the electrically conductive layer coated aluminum materials in examples 1 through 4 exhibits the below-described effects. Specifically, in each of the electrically conductive layer coated aluminum materials in examples 1 through 4, the first electrically conductive layer 2 is formed on the surface of the aluminum material 1. Because this first electrically conductive layer 2 has the extremely close structure, in a case where each of the electrically conductive layer coated aluminum materials in examples 1 through 4 is exposed to an atmosphere having a high temperature and a high humidity for a long period of time, the penetration of moisture contained in the atmosphere into the surface of the aluminum material 1 can be suppressed. In addition, because on the surface of this first electrically conductive layer 2, the second electrically conductive layer 4 including the carbon is further formed, the presence of this second electrically conductive layer 4 including the carbon, together with the first electrically conductive layer 2, enables the electrical conductivity to be ensured. As a result, it is inferred that as compared with the conventional carbon coated aluminum material, the hydration reaction with the moisture in the atmosphere having the high humidity is suppressed, the electrical conductivity can be ensured, and it is made possible that each of the electrically conductive layer coated aluminum materials according to the present invention can be used in a harsh atmosphere having a high temperature and a high humidity for a longer period of time than the conventional one.

The described embodiment and examples are to be considered in all respects only as illustrative and not restrictive. It is intended that the scope of the invention is, therefore, indicated by the appended claims rather than the foregoing description of the embodiment and examples and that all modifications and variations coming within the meaning and equivalency range of the appended claims are embraced within their scope.

INDUSTRIAL APPLICABILITY

By using an electrically conductive layer coated aluminum material according to the present invention, an electrode structure of: an electrode or a current collector of a capacitor such as an electric double layer capacitor, an aluminum electrolytic capacitor, and a functional solid capacitor; a current collector and an electrode of a secondary battery such as a lithium ion battery; or the like is formed, thereby allowing capacitance characteristics, internal resistance characteristics, charge and discharge characteristics, and life of a capacitor or a battery to be enhanced.

REFERENCE SIGNS LIST

1: aluminum material, 2: first electrically conductive layer, 3: interposing layer, 4: second electrically conductive layer, 41: carbon-containing particle.

The invention claimed is:

1. An electrically conductive layer coated aluminum material comprising:
an aluminum material;
a first electrically conductive layer being formed on a surface of the aluminum material and including an organic substance having electrical conductivity;
an interposing layer being formed between the aluminum material and the first electrically conductive layer and including a carbide of aluminum; and
a second electrically conductive layer being formed on a surface of the first electrically conductive layer and including carbon,
wherein the first electrically conductive layer is free of carbon-containing particles, and the second electrically conductive layer comprises carbon-containing particles, and
wherein a hydrochloric acid exfoliation time is not less than 300 seconds.

2. The electrically conductive layer coated aluminum material according to claim 1, wherein the interposing layer includes a surface part being formed in a region of at least one part of the surface of the aluminum material and including the carbide of aluminum.

3. The electrically conductive layer coated aluminum material according to claim 1, wherein a thickness of the first electrically conductive layer is greater than or equal to 0.5 μm and less than or equal to 10 μm.

4. The electrically conductive layer coated aluminum material according to claim 1, wherein the first electrically conductive layer is formed of a substance which is not volatilized by heating in an atmosphere including a hydrocarbon-containing substance at a temperature in a range of greater than or equal to 450° C. and less than 660° C. for a period of time greater than or equal to one hour and less than or equal to 100 hours.

5. The electrically conductive layer coated aluminum material according to claim 1, wherein the electrically conductive layer coated aluminum material is used to form an electrode structure.

6. The electrically conductive layer coated aluminum material according to claim 5, wherein the electrode structure is either of a current collector or an electrode of a capacitor.

7. The electrically conductive layer coated aluminum material according to claim 5, wherein the electrode structure is either of a current collector or an electrode of a battery.

8. A method for manufacturing an electrically conductive layer coated aluminum material, comprising:
- a first step of forming a first electrically conductive precursor layer by attaching a resin onto a surface of an aluminum material and drying the resultant;
- a second step, after the first step, of forming a second electrically conductive precursor layer by attaching a carbon-containing substance onto the first electrically conductive precursor layer; and
- a third step, after the second step, of forming a first electrically conductive layer including an organic substance having electrical conductivity on the surface of the aluminum material, forming an interposing layer including a carbide of aluminum between the aluminum material and the first electrically conductive layer, and forming a second electrically conductive layer including carbon on a surface of the first electrically conductive layer, by placing the aluminum material in a space including a hydrocarbon-containing substance and heating the placed aluminum material.

9. The method, according to claim 8, for manufacturing the electrically conductive layer coated aluminum material, wherein the second step includes a drying step of drying the second electrically conductive precursor layer.

10. The method, according to claim 8, for manufacturing the electrically conductive layer coated aluminum material, wherein the third step includes heating the aluminum material at a temperature in a range of greater than or equal to 450° C. and less than 660° C.

11. The method, according to claim 8, for manufacturing the electrically conductive layer coated aluminum material, wherein the resin is a resin which is not volatilized by heating in an atmosphere including a hydrocarbon-containing substance at a temperature in a range of greater than or equal to 450° C. and less than 660° C. for a period of time greater than or equal to one hour and less than or equal to 100 hours.

* * * * *